United States Patent
Panzetti et al.

(10) Patent No.: US 7,648,604 B2
(45) Date of Patent: Jan. 19, 2010

(54) LABELLING MACHINE WITH ULTRASOUND WELDING DEVICE FOR MAKING A TUBULAR LABEL MADE OF HEAT-SHRINKING FILM AND WELDING PROCESS

(75) Inventors: Luigi Panzetti, Parma (IT); Vanni Zacche', Roncoferraro (IT)

(73) Assignee: Sidel Holdings & Technology SA, Geneva (CH)

( * ) Notice: Subject to any disclaimer, the term of this patent is extended or adjusted under 35 U.S.C. 154(b) by 131 days.

(21) Appl. No.: 10/592,150

(22) PCT Filed: Feb. 25, 2005

(86) PCT No.: PCT/EP2005/001995

§ 371 (c)(1),
(2), (4) Date: Sep. 8, 2006

(87) PCT Pub. No.: WO2005/085073

PCT Pub. Date: Sep. 15, 2005

(65) Prior Publication Data

US 2007/0175591 A1 Aug. 2, 2007

(30) Foreign Application Priority Data

Mar. 9, 2004 (IT) .......................... PR2004A0018

(51) Int. Cl.
*B32B 37/00* (2006.01)

(52) U.S. Cl. .................. 156/73.4; 156/73.1; 156/556; 156/580.2

(58) Field of Classification Search ................ 156/73.1, 156/73.4, 556, 580.1, 580.2
See application file for complete search history.

(56) References Cited

U.S. PATENT DOCUMENTS

| 4,070,513 | A | 1/1978 | Rhoads et al. | |
|---|---|---|---|---|
| 4,208,237 | A | 6/1980 | Heyne | |
| 4,302,275 | A | 11/1981 | Burmeister et al. | |
| 4,878,985 | A * | 11/1989 | Thomsen et al. | 156/459 |
| 5,078,817 | A * | 1/1992 | Takagaki | 156/73.1 |
| 5,415,721 | A | 5/1995 | Nickey et al. | |
| 6,217,686 | B1 * | 4/2001 | Kelley et al. | 156/73.1 |
| 6,797,088 | B2 * | 9/2004 | Solinski | 156/73.4 |
| 6,824,630 | B2 * | 11/2004 | Oishi et al. | 156/73.1 |
| 2001/0002614 | A1 | 6/2001 | Menayan | |
| 2003/0062110 | A1 * | 4/2003 | Urlaub et al. | 156/73.1 |
| 2003/0221764 | A1 * | 12/2003 | Yu | 156/73.4 |

FOREIGN PATENT DOCUMENTS

EP 0 313 406 A 4/1989

* cited by examiner

*Primary Examiner*—James Sells
(74) *Attorney, Agent, or Firm*—Pearne & Gordon LLP

(57) ABSTRACT

The invention refers to the field of labelling machines that use tubular labels, and in particular it refers to ultrasound welding apparata for making a tubular label made of a heat-shrinking film, precut from a coil.

The apparatus provides for the label welding for the whole length of the surmount (5), the apparatus being able to translate on at least two Cartesian axes; moreover, it guarantees one or more welding beads due to the presence, on the sonotrode, of a plurality of ribs (6): the formation of one or more beads will have to be attributed to the more or less correct position of the precut label and the errors caused during its transfer. The presence of many beads is an improving condition of the resistance to tensile stress of the welded label.

5 Claims, 2 Drawing Sheets

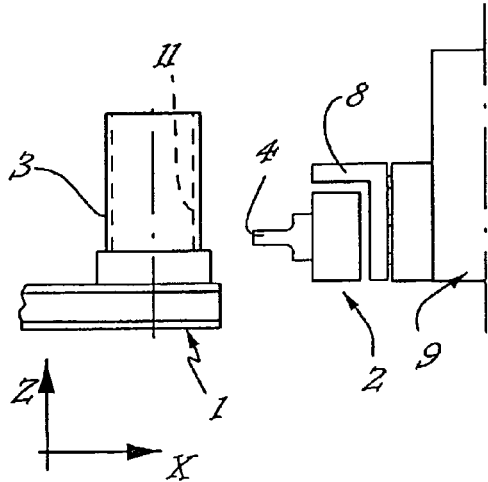
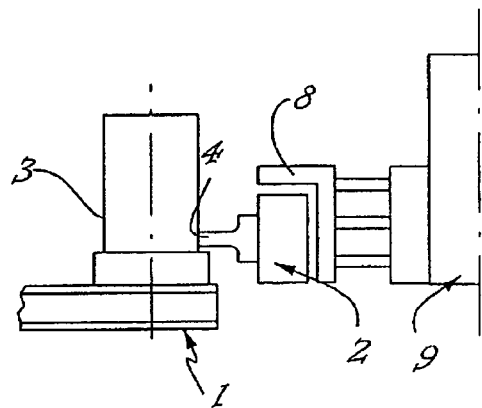
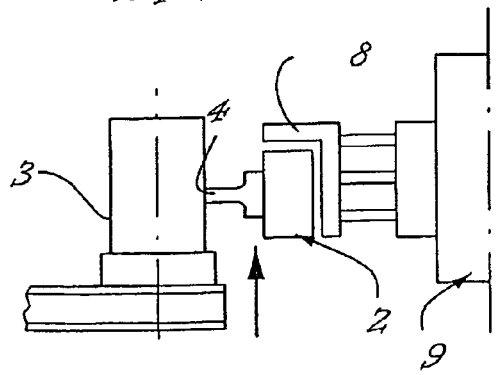
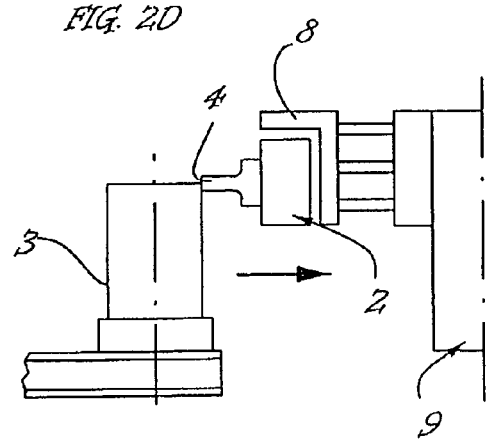
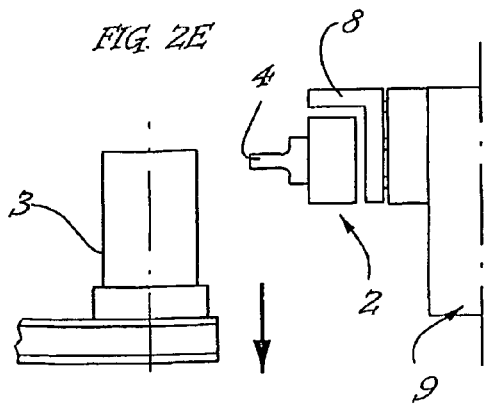

LABELLING MACHINE WITH ULTRASOUND WELDING DEVICE FOR MAKING A TUBULAR LABEL MADE OF HEAT-SHRINKING FILM AND WELDING PROCESS

CROSS-REFERENCE TO RELATED APPLICATION

This application is a National Stage entry of International Application No. PCT/EP2005/001995, filed Feb. 25, 2005, which in turn claims priority from Italian Patent Application No. PR2004A000018 filed Mar. 9, 2004 the entire specification claims and drawings of both of which are incorporated herewith by reference.

The present invention deals with a labelling machine with ultrasound welding device for making a tubular film made of heat-shrinking film, and with a welding process.

The term labelling machines with tubular labels (in the art commonly called sleeve labels) means machines that are able to apply tubular labels to cylindrical bodies or revolution bodies in general; labelling machines can be of the low-productivity linear type, or of the high-productivity turntable rotating type.

The known prior arts when forming tubular labels are substantially divided into two groups: machines forming tubular labels that are then transferred for wrapping around the vessel, and machines transferring the vessel inside preformed tubular labels.

The prior art uses in both cases a welding apparatus that applies a heat-welding or chemical welding process on overlapped label edges, called surmount.

An example is the one disclosed in Italian Patent Application N. PR20002A000049 of the same Applicant.

A prior art inconvenience can occur when a wrong overlapping of the surmount is performed onto the label precut from a coil, generating a product with scarce quality and resistance to tensile stress of the heat-welded product, since it is subjected to partial welding.

Object of the present invention is applying, to a labelling machine with tubular labels, an ultrasound welding device for making a tubular label made of heat-shrinking film, that is able to guarantee one or more welding lines even when there is a wrong surmount within certain overlapping angular error ranges.

The advantages that are obtained with the process of the present invention are:

it allows recovering the possible overlapping angular error between two tubular label edges;

always guaranteeing one or more parallel welding beads;

improving the quality and mechanical resistance constant of the welded surmount.

These objects and advantages are all reached by the labelling machine with ultrasound welding device for making a tubular label made of heat-shrinking film, subject of the present invention, that is characterised in what is included in the below-listed claims.

Characteristics and advantages will be better pointed out by the following description of some preferred embodiments shown, merely as a non-limiting example, in the enclosed tables of drawing, in which:

FIG. 1 shows a schematical representation of the assembly formed by a labelling machine and an ultrasound welding machine;

FIGS. 2*a*, 2*b*, 2*c*, 2*d*, and 2*e* show a diagram of the operating movements of the main axes of the welding device during the steps of approaching, welding and detaching from the area to be welded;

Figure 1:
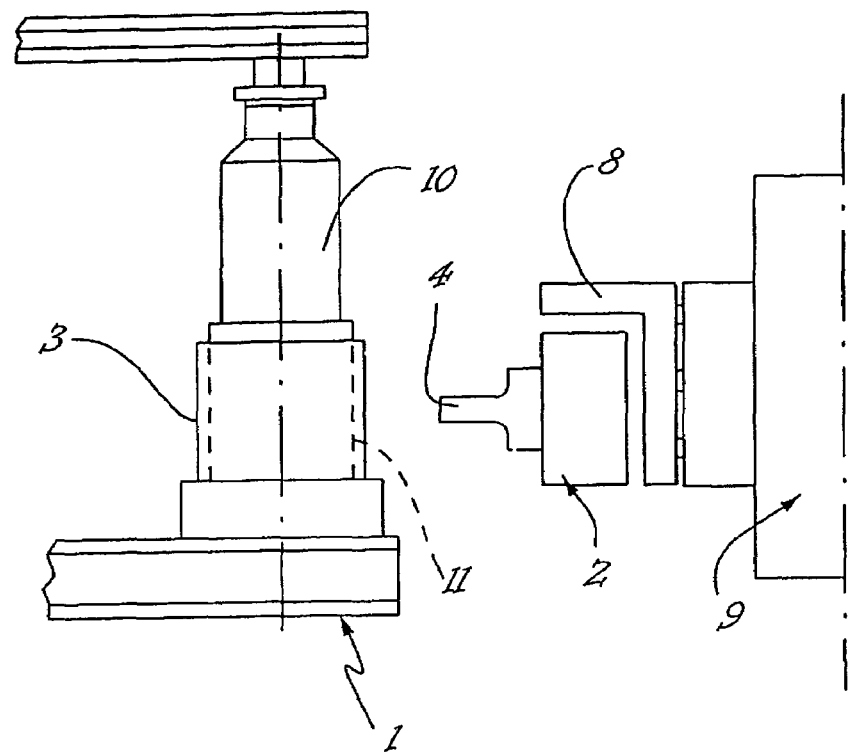

With reference to FIG. 1, 1 designates, as a whole, a labelling machine of the type with which a tubular label 3 made of heat-shrinking film is made, that completely or partially wraps around the side surface of a bottle or vessel 10.

The tubular label can be formed onto the bottle or onto a winding drum 11, like in the example shown, in order to be then transferred onto the bottle, or it is the bottle that is inserted inside the label, once its edges are joined.

2 designates a ultrasound welding device assembled on a bracket 8 of a turret 9.

With reference to FIG. 2, it can be noted that the bracket 8 that supports the ultrasound welding device 2 performs an approaching manoeuvre to the surface to be labelled along axis X in the figure, and then, once having come in contact with the surmount 5, it starts the welding action by going up for the whole length of the surmount itself, in the case in the figure designated as Z.

It must be taken into account that the welding direction depends on the label 3 direction, in turn depending on the position of the vessel 10 to be labelled.

After having ended the welding step, the ultrasound welding apparatus 2 is detached, going back to its starting position.

Figure 3:
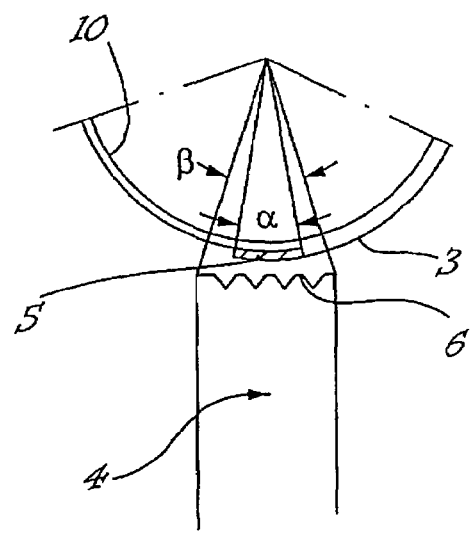
FIG. 3 shows a plan representation of the contact assembly of sonotrode and label surmount area.

With reference to FIG. 3, it can be observed that angle α of the surmount 5 of the label 3 is less than angle β of the sonotrode 4 (these angles have their center on the vertical revolution axis of the vessel): this implies that angle α (representing the overlapping of label edges, namely the surmount 5) can be in a plurality of position inside angle β of the sonotrode 4.

Those that could be position tolerance errors of the surmount 5, due to transfer clearances or errors, are therefore compensated for, and a local contact with one or more projecting roughnesses of the surmount 5 equally occurs, anyway guaranteeing a welding contact.

Figure 4:
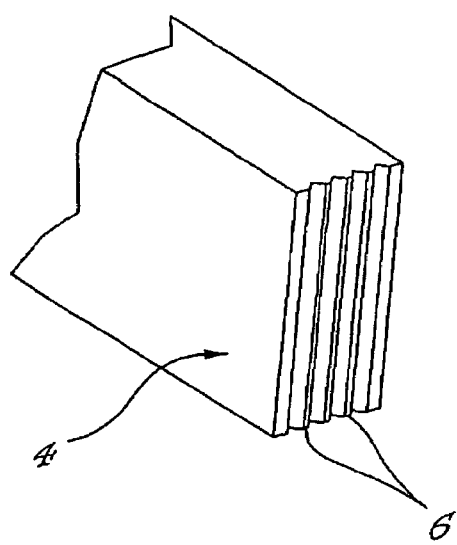
FIG. 4 shows a representation only of the sonotrode used for the welding process.

With reference to FIG. 4, the plurality of ribs 6 of the sonotrode 4 are pointed out and generate the formation of one or more welding beads of the surmount 5.

The plurality of ribs of the sonotrode are able to guarantee one or more parallel welding beads when the angular position of the surmount changes within a tolerance range with respect to the fixed sonotrode position.

According to a possible variation of an embodiment, not shown, the sonotrode can be mounted on a turret provided with a single movement towards the surmount and it can guarantee the contact on the whole surmount height, by means of an adequate sonotrode geometry whose height will be equal to the label height.

The invention claimed is:

1. Labeling machine, comprising:

supporting means around which a film section is wrapped for forming a tubular label, vertical edges of said film section being overlapped over said support means in order to make a surmount, said surmount covering an angle along a curvilinear surface of said film section;

an ultrasound welding device having a sonotrode, said welding device being assembled on a turret able to make said sonotrode cover an angle along a curvilinear surface of said film section greater than the angle formed by said surmount of the label to be welded, guaranteeing the welding contact also with position tolerance errors of the surmount due to transfer clearances or errors of the label, wherein said ultrasound welding device performs the welding process for a whole length of the surmount segment to be welded by performing a movement along two Cartesian axes according to a direction imposed by the surmount line.

2. Ultrasound welding process for making tubular labels made of heat-shrinking film, comprising the following steps:

forming a tubular label by wrapping a film section in such a way as vertical edges of said film section are overlapped over said support means in order to make a surmount, said surmount covering an angle along a curvilinear surface of said film section;

welding said overlapping vertical edges along said surmount by means of a welding device comprising a sonotrode covering an angle greater than the angle formed by said surmount of the label to be welded, guaranteeing the welding contact also with position tolerance errors of the surmount due to transfer clearances or errors of the label, wherein said sonotrode performs the welding process for a whole length of the surmount segment to be welded by performing a movement along two Cartesian axes according to a direction imposed by the surmount line.

3. Ultrasound welding process for making tubular labels made of heat-shrinking film according to claim 2, wherein said sonotrode is formed of a plurality of parallel ribs for guaranteeing the formation of one or more welding beads, thereby guaranteeing a correct welding.

4. Labeling machine comprising:

supporting means around which a film section is wrapped for forming a tubular label, vertical edges of said film section being overlapped over said support means in order to make a surmount, said surmount covering an angle along a curvilinear surface of said film section;

an ultrasound welding device having sealing means, said welding device being assembled on a turret able to make said sealing means cover an angle along a curvilinear surface of said film section greater than the angle formed by said surmount of the label to be welded, guaranteeing the welding contact also with position tolerance errors of the surmount due to transfer clearances or errors of the label, wherein said sealing means perform the welding process for a whole length of the surmount segment to be welded by performing a movement along two Cartesian axes according to a direction imposed by the surmount line.

5. Ultrasound welding process for making tubular labels made of heat-shrinking film, comprising the following steps:

forming a tubular label by wrapping a film section in such a way as vertical edges of said film section are overlapped over said support means in order to make a surmount, said surmount covering an angle along a curvilinear surface of said film section;

welding said overlapping vertical edges along said surmount by means of a welding device comprising sealing means covering an angle greater than the angle formed by said surmount of the label to be welded, guaranteeing the welding contact also with position tolerance errors of the surmount due to transfer clearances or errors of the label, wherein said sealing means perform the welding process for a whole length of the surmount segment to be welded by performing a movement along two Cartesian axes according to a direction imposed by the surmount line.

* * * * *